United States Patent
Yu et al.

(10) Patent No.: US 11,030,445 B2
(45) Date of Patent: Jun. 8, 2021

(54) SORTING AND DISPLAYING DIGITAL NOTES ON A DIGITAL WHITEBOARD

(71) Applicant: LENOVO (Singapore) PTE. LTD., New Tech Park (SG)

(72) Inventors: Jonathan Jen-Wei Yu, Raleigh, NC (US); Lincoln Penn Hancock, Raleigh, NC (US); Jeffrey E. Skinner, Raleigh, NC (US); Aaron Michael Stewart, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 62 days.

(21) Appl. No.: 15/499,654

(22) Filed: Apr. 27, 2017

(65) Prior Publication Data

US 2018/0314882 A1     Nov. 1, 2018

(51) Int. Cl.
| | |
|---|---|
| *G06F 3/048* | (2013.01) |
| *G06K 9/00* | (2006.01) |
| *G06F 3/0482* | (2013.01) |
| *G06F 16/583* | (2019.01) |
| *G06F 16/58* | (2019.01) |
| *G06K 9/62* | (2006.01) |
| *G06F 16/338* | (2019.01) |
| *G06Q 10/10* | (2012.01) |
| *G06F 3/0483* | (2013.01) |
| *G06F 3/0481* | (2013.01) |

(Continued)

(52) U.S. Cl.
CPC ....... *G06K 9/00422* (2013.01); *G06F 3/0481* (2013.01); *G06F 3/0482* (2013.01); *G06F 3/0483* (2013.01); *G06F 16/338* (2019.01); *G06F 16/5846* (2019.01); *G06F 16/5866* (2019.01); *G06F 40/169* (2020.01); *G06F 40/30* (2020.01); *G06K 9/6253* (2013.01); *G06Q 10/10* (2013.01); *G06Q 10/101* (2013.01); *G06K 2209/27* (2013.01)

(58) Field of Classification Search
CPC .............. G06Q 10/101; G06Q 10/10; G06T 2219/024; G06F 8/71; G06F 3/0482; G06F 40/30; G06F 40/169; G06F 16/338; G06F 3/0483; G06F 3/0481; G06F 16/5846; G06F 16/5866; G06K 2209/27; G06K 9/00422; G06K 9/6253
USPC ................................ 715/751, 753, 765, 845
See application file for complete search history.

(56) References Cited

U.S. PATENT DOCUMENTS

| | | | | |
|---|---|---|---|---|
| 8,706,685 B1 * | 4/2014 | Smith | ............... | G06F 17/30882 |
| | | | | 707/608 |
| 2003/0206201 A1 * | 11/2003 | Ly | .......................... | G06Q 10/10 |
| | | | | 715/835 |

(Continued)

*Primary Examiner* — Alex Olshannikov
(74) *Attorney, Agent, or Firm* — Kunzler Bean & Adamson

(57) ABSTRACT

For sorting and displaying digital notes on a digital whiteboard, an apparatus is disclosed. A system, method, and program product also perform the functions of the apparatus. The apparatus for sorting and displaying digital notes on a digital whiteboard includes a processor and a memory. The memory stores code executable by the processor. The processor receives a plurality of digital notes, identifies a plurality of categories, and sorts each digital note with at least one category based on metadata associated with each digital note. The processor displays, on the digital whiteboard, each of the plurality of digital notes at a location based on the at least one category.

21 Claims, 10 Drawing Sheets

(51) Int. Cl.
*G06F 40/30* (2020.01)
*G06F 40/169* (2020.01)

(56) References Cited

U.S. PATENT DOCUMENTS

| | | | |
|---|---|---|---|
| 2014/0282077 A1* | 9/2014 | Wilson | G06F 3/0482 |
| | | | 715/751 |
| 2015/0135046 A1* | 5/2015 | Moore | G06Q 10/06311 |
| | | | 715/202 |
| 2015/0355824 A1* | 12/2015 | Ueno | G06F 3/04845 |
| | | | 715/751 |
| 2017/0161246 A1* | 6/2017 | Klima | G06F 17/241 |

* cited by examiner

SORTING AND DISPLAYING DIGITAL NOTES ON A DIGITAL WHITEBOARD

FIELD

The subject matter disclosed herein relates to digital whiteboards and more particularly relates to sorting and displaying digital notes on a digital whiteboard.

BACKGROUND

During brainstorming sessions, multiple notes (e.g., adhesive notes) are used to quickly record ideas and solutions for a given problem. Managing the placement and categorization of the note content is difficult due to the sheer amount of handwritten information that needs to be processed in real time. Often, people will cluster notes and ideas that share similar characteristics.

BRIEF SUMMARY

An apparatus for sorting and displaying digital notes on a digital whiteboard is disclosed. A method and computer program product also perform the functions of the apparatus.

One apparatus for sorting and displaying digital notes on a digital whiteboard includes a processor and a memory. The memory stores code executable by the processor. The processor receives a plurality of digital notes and sorts each digital note with at least one category of a plurality of categories based on metadata associated with each digital note. The processor displays, on the digital whiteboard, each of the plurality of digital notes at a location based on the at least one category.

In some embodiments, receiving a plurality of digital notes comprises receiving a handwritten note. Here, the processor may digitize (or receive a digitized version) of the handwritten note. For example, the apparatus may include an imaging device, such as a camera, a scanner, a digitizer, or other device for capturing content of the handwritten note as image data. In such embodiments, the processor converts handwriting in the handwritten note into text. Here, optical character recognition routines may be used to convert handwritten characters (e.g., in the image data representative of the handwritten note) into text.

Further, the processor identifies, for each digital note, at least one topic from the content (e.g., text) of the digital note. The processor also associated metadata with each digital note, the metadata including the at least one identified topic. In certain embodiments, the processor adds a metadata tag (or label) to each digital note. Here, the metadata tag may indicate a category or sub-category to which the digital note belongs.

In one embodiment, the processor further identifies one or more metadata tags belonging to the digital notes. In such embodiments, the processor identified a plurality of categories based on the metadata tags. In another embodiment, the processor suggests one or more categories to a user based on content from the plurality of digital notes and receives user selection of at least one suggested category. Further, the processor identifies the plurality of categories including the at least one user-selected category.

In some embodiments, the processor receives a user query and rearranges the digital notes within the digital whiteboard in response to the user query. In certain embodiments, the processor displays only a subset of the plurality of digital notes on the digital whiteboard in response to the user query invoking a filter.

In certain embodiments, at least one of the plurality of digital notes includes an image or drawing. In such embodiments, the processor further analyzes the image/drawing and tags the digital note including the image/drawing with metadata describing the image/drawing. Here, associating each digital note with at least one category based on metadata associated with each digital note includes the processor sorting the at least one digital note including an image/drawing into a category based on the metadata describing the image/drawing. In further embodiments, the metadata describing the image or drawing is generated from the image/drawing.

One method for sorting and displaying digital notes on a digital whiteboard includes receiving, by use of a processor, a plurality of digital notes. The method includes associating each digital note with at least one category a plurality of categories based on metadata associated with each digital note. The method also includes displaying each of the plurality of digital notes on a digital whiteboard at a location based on the at least one category.

In some embodiments, receiving a plurality of digital notes includes receiving a handwritten note. In such embodiments, the method also includes converting handwriting in the handwritten note into text and identifying at least one topic from the text. The method further includes associating metadata with the handwritten note. Here, the metadata include the at least one topic.

In certain embodiments, the method includes analyzing content of each digital note and identifying at least one category from the content, wherein the plurality of categories includes the at least one category. In such embodiments, the method may include automatically adding a metadata tag to each digital note. Here, the metadata tag indicates a category to which the digital note belongs. The method may also include associating one or more subcategories with each digital note based on the analysis of its content. Here, each subcategory belongs to one of the identified plurality of categories.

In one embodiment, the method further includes associating metadata with each digital note based on analysis of the contents of each digital note and receiving a user command specifying the plurality of categories. Here, associating each digital note with at least one category includes sorting each digital note into one or more of the user-specified plurality of categories based on the metadata. In another embodiment, the method further includes suggesting one or more categories to a user based on content from the plurality of digital notes, receiving user selection of at least one suggested category, and identifying the plurality of categories including the at least one user-selected category.

In some embodiments, the method also includes receiving a user command and rearranging the digital notes in response to the user command. In a further embodiment, the method may include displaying only a subset of the plurality of digital notes in response to the user command invoking a filter. In certain embodiments, the method includes associating metadata with each digital note in response to receiving the digital note. Here, the metadata may include one or more of: a time of creation, an author, an ink color, a note color, a geographic location, a topic, a prompt associated with the note, and a user-supplied category.

The program product includes a computer readable storage medium that stores code executable by a processor. Here, the executable code includes code to perform: receiving a plurality of digital notes, identifying a plurality of categories, associating each digital note with at least one category based on metadata associated with each digital note, and displaying each of the plurality of digital notes on a digital whiteboard at a location based on the at least one category for each digital note. Here, the associated category is one of the identified plurality of categories.

In certain embodiments, identifying a plurality of categories comprises analyzing content of each digital note to identify at least one topic. Here, the plurality of categories is selected based on the identified at least one topic. The program product may further include code to perform: automatically adding a metadata tag to each digital note, the metadata tag indicating a category to which the digital note belongs. In one embodiment, the digital whiteboard is a shared digital whiteboard and the plurality of digital notes are received from a plurality of users. In such embodiments, program product may further include code to perform: associating metadata with each digital note, the metadata including an indication of the user creating the note.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
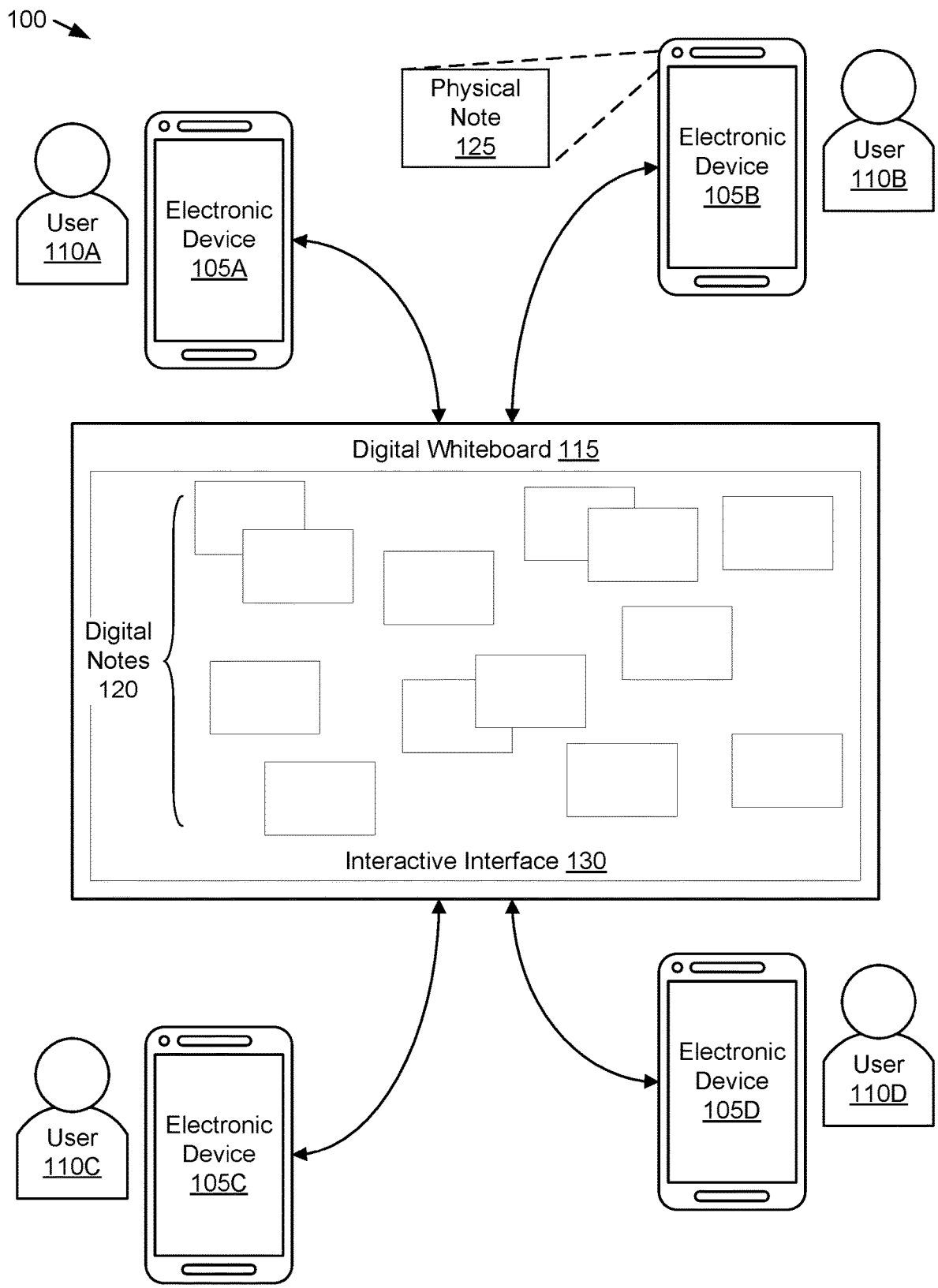
FIG. 1 is a schematic block diagram illustrating one embodiment a system for sorting and displaying digital notes on a digital whiteboard.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These codes may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

The present disclosure describes systems, apparatus, and method for sorting and displaying digital notes on a digital whiteboard. Generally, upon receiving the digital notes, the disclosed embodiments automatically begin to categorize and visually group notes together, for example by placing proximal to similarly categorized notes on a digital whiteboard/canvas. Where digital notes include handwritten content, optical character recognition and similar tools may be used to digitize the notes' content. Embodiments may automatically suggest categories (e.g., using artificial intelligence analysis of note content and context), automatically tag notes based on content, and automatically sort notes based on content. In certain embodiments, a user may use a hashtag or other metadata tag to indicate a topic or category when creating the note. Additionally, the systems/apparatus/methods may automatically generate hashtags or other metadata tags after analyzing the notes' content. Sorting and displaying digital notes on a digital whiteboard may include automatically clustering notes together with the same metadata tag (e.g., hashtag), whether the tag was handwritten, typed, or automatically generated. If a note has multiple hashtags, different instances of the note may be places in the correct categories or visually grouped proximal to other notes of matching hashtags. The systems/apparatus/methods may generate different sorting visualizations based on a filter control or query, for example after receiving user commands such as "Show only notes with the hashtag #vacationideas," "Show notes that Jeff created," and "Show notes that are similar or redundant." The systems/apparatus/methods may automatically generate/suggest categories and tags based on aggregate note content.

FIG. 1 depicts a system 100 for sorting and displaying digital notes on a digital whiteboard 115, according to embodiments of the disclosure. The system 100 includes a plurality of electronic devices 105A, 105B, 105C, and 105D, each electronic device 105A-D being operated by a user (e.g., the users 110A, 110B, 110C, and 110D, respectively). The electronic devices 105A-D allow the users 110A-D to interact with a digital whiteboard 115. While a specific number of electronic devices and users are depicted, in other embodiments the number of electronic devices and/or users may be greater or fewer than those shown in FIG. 1. For example, a single user may interact with the digital whiteboard 115, wherein the digital whiteboard 115 automatically sorts and displays digital notes as described herein.

The digital whiteboard 115 contains a plurality of digital notes 120. In some embodiments, a digital note 120 is a digitized representation of the physical note 125. For example, the user 110B may create the physical note 125 and the electronic device 105B may use a camera, scanner, or other imager to create a digital representation of the physical note 125. Here, the physical note 125 may be a handwritten note, such as a handwritten sticky note (i.e., a small piece of paper with a strip of pressure sensitive adhesive on its back).

The electronic devices 105A-D may include a processor and memory, an electronic display, an input device (e.g., a touch-sensitive panel coupled to the electronic display). As mentioned above, one or more of the electronic devices 105A-D may include a camera, scanner, or other imager. The electronic devices 105A-D may run a whiteboard client application for interacting with the digital whiteboard 115. In some embodiments, the whiteboard client application allows a user (e.g., one of the users 110A-D) to create, edit, remove, and/or place a digital note 120, as well as manipulate its location within the digital whiteboard 115. In one embodiment, one of the electronic devices 105A-D hosts the digital whiteboard 115, as discussed below with reference to FIG. 2. In another embodiment, the digital whiteboard 115 is separate device within the system 100 having its own processor, memory, display, input device, etc.

The digital whiteboard 115 includes an interactive interface 130 where the plurality digital notes 120 are displayed. The digital notes 120 may be received from electronic devices 105A-D and/or may be generated at the digital whiteboard 115 (e.g., in response to user interaction with the interactive interface 130). In one embodiment, the digital whiteboard 115 includes a physical display, such as a large LED panel, LCD panel, or other electronic display that presents the interactive interface 130. In another embodiment, the digital whiteboard 115 includes a projector that projects the interactive interface 130 onto a surface. The digital whiteboard 115 may receive user inputs via a touch panel, a pointer device, camera-capture, voice command, and the like.

In some embodiments, the digital whiteboard 115 includes its own computer hardware for hosting the interactive interface 130 and receiving user inputs. For example, the digital whiteboard 115 may include a host computer (having a processor and memory) that runs a whiteboard application, where whiteboard application provides a whiteboard interface, receives/processes inputs from one or more participants (e.g., the users 110A-D), and creates, edits, deletes, and/or manipulates digital notes 120 within the whiteboard interface responsive to user inputs. In certain embodiments, the digital whiteboard 115 includes a whiteboard server application that interfaces with one or more whiteboard client applications on the electronic devices 105A-D to create, edit, delete, and/or manipulate the digital notes 120.

In certain embodiments, one or more of the electronic devices 105A-D are located at a different geographic location than the digital whiteboard 115. For example, each of the users 110A-D may be located in different offices, different cities, different states/nations, and the like. In such embodiments, an electronic device may display a copy of the digital whiteboard 115 (e.g., the interactive interface 130 and the digital notes 120).

The digital whiteboard 115 receives a plurality of digital notes 120. The plurality of digital notes 120 may be received from one or more of the electronic devices 105A-D. In some embodiments, the digital whiteboard 115 identifies a plurality of categories for the digital notes 120. In one embodiment, the categories are predefined, for example in response to user input. In another embodiment, the digital whiteboard 115 may suggest one more categories and a user (e.g., one of the users 110A-D) may select the plurality of categories. In other embodiments, plurality of categories may be identified from both predefined categories and user selection of suggested categories.

The digital whiteboard 115 sorts each of the digital notes 120 into at least one category (e.g., associates each digital note 120 with one or more of the identified categories) based on metadata associated with each digital note 120. Here, the digital whiteboard 115 uses artificial intelligence tools to sort each note into one or more categories. The digital whiteboard 115 may use metadata of each of the digital notes 120 to sort the digital notes 120 into the categories. Additionally, the digital whiteboard 115 may analyze the content of each of the digital notes 120 when sorting the digital notes 120. For example, the digital whiteboard 115 may analyze content (e.g., text) of the digital notes 120 to identify topics for the digital notes 120.

Analysis of the note's content may include using artificial intelligence tools including, but not limited to, natural language processing and semantic search using the terms/keywords in the content. Here, natural language processing is used to identify various meanings of the language used by the note's author. For example, natural language processing may be used to parse or segment the text content into linguistic structures and distinguish keywords and parts of speech. Natural language processing may also be used to separate the content by topic and to resolve ambiguous language (e.g., word sense disambiguation).

Semantic search tools may be used to interpret intent and meaning of the note's content by using the context of the digital note. Here, relevant content includes a prompt associated with the note, content of previous notes by the author or group, placement of the digital notes relative to other digital notes (e.g., if the digital note is initially placed near another note). Semantic search may identify relationships (e.g., links) between terms in the note's content to build a semantic network and map concepts from the note's content. Additional tools such as knowledge maps may be used to link the note's concept to topics (e.g., to sort into categories). These identified topics may then be associated with each digital note by storing the topics as metadata.

Further, the digital whiteboard 115 may monitor user activities to categorize the digital notes 120. For example, the digital whiteboard 115 (or a whiteboard application on an electronic device 105A-D) may allow the users 110A-D to group or categorize the digital notes 120 via voice, text, or handwritten query/command. In one embodiment, the digital whiteboard begins to sort the digital notes 120 after a predetermined number are received (e.g., after receiving four or more digital notes 120).

Having sorted the digital notes 120 into the identified categories, the digital whiteboard 115 visually arranges (e.g., displays) the digital notes 120 within the interactive interface 130 based on the identified categories. In some embodiments, the digital whiteboard 115 displays each digital note 120 at a location based on the determined category. In certain embodiments, the digital whiteboard 115 rearranges the digital notes 120 in response to user command. In one embodiment, the user command may redefine the categories, wherein the digital whiteboard 115 re-sorts the digital notes 120 into the redefined categories and rearranges the digital notes 120 within the interactive interface 130 based on the re-sorting. In another embodiment, the user command may invoke a filter control (e.g., "show only notes that . . . ") and the digital whiteboard 115 may display only a subset of the digital notes 120 (as well as rearranging the subset within the interactive interface 130).

For example, where the digital notes 120 are associated with the prompt "Favorite Animals," auto-generated categories may include categorizing by taxonomic classification (e.g., by animal kingdom). Later, a user may issue a command requesting the re-sorting the digital notes 120 by characteristics, such as "Group by animals with feathers and without," "Group by average lifespan," or "Group by natural habitat." Further, a user may invoke a filter control such as the command "Show only reptiles."

Figure 2:
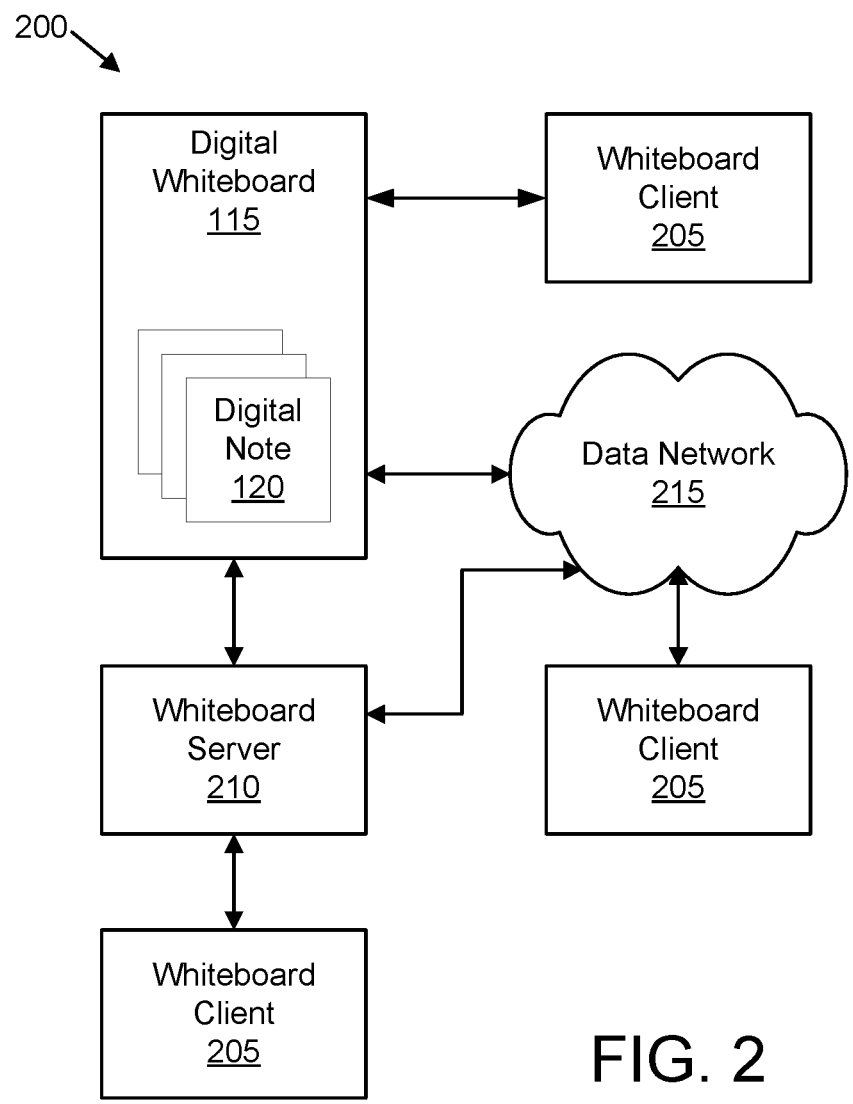
FIG. 2 is a schematic block diagram illustrating one embodiment a network environment for sorting and displaying digital notes on a digital whiteboard.

FIG. 2 depicts a network environment 200 for sorting and displaying digital notes on a digital whiteboard 115, according to embodiments of the disclosure. The network environment 200 includes a plurality of whiteboard clients 205. The whiteboard clients 205 may be embodiments of the electronic devices 105A-D. Alternatively, the whiteboard client 205 may be a client application running on an electronic device 105. The whiteboard clients 205 allow users to interact with the digital whiteboard 115.

As depicted, a whiteboard client 205 may interact directly with the digital whiteboard 115, for example over a wireless connection, wired connection, or the whiteboard client 205 being integrated with the digital whiteboard 115. Also as depicted, a whiteboard client 205 may interact with the digital whiteboard 115 via a data network 215. Here, both the whiteboard client 205 and the digital whiteboard 115 include communication hardware for communicating over the data network 215.

The network environment 200 may also include a whiteboard server 210. The whiteboard server 210 may include hardware and/or software for providing and/or controlling the digital whiteboard 115. For example, the whiteboard server 210 may receive digital notes from the whiteboard clients 205 and/or the digital whiteboard 115 itself. As depicted, a whiteboard client 205 communicate with the whiteboard server 210 to interact with the digital whiteboard 115.

The whiteboard server 210 may associate metadata with the digital notes, such as authors, dates/times of creation, geographic locations of creation, note color, ink color, whether the notice handwritten or not, whether (or not) the note includes an image or drawing/doodle, metadata tags (e.g., describing a topic to which the note relates), and the like. Further, the whiteboard server 210 may sort the digital notes 120 into categories and display a digital note 120 at a specific location within the digital whiteboard 115 based on its category. While a specific number of whiteboard clients 205 are depicted, in other embodiments the number of whiteboard clients 205 may be more or fewer than those depicted.

The data network 215, in one embodiment, is a telecommunications network configured to facilitate electronic communications, for example among the digital whiteboard 115, whiteboard client(s) 205, and/or the whiteboard server 210. The data network 215 may be comprised of wired data links, wireless data links, and/or a combination of wired and wireless data links. Examples of wireless data networks include, but are not limited to, a wireless cellular network, a local wireless network, such as a Wi-Fi® network, a Bluetooth® network, a near-field communication (NFC) network, an ad hoc network, and/or the like. The data network 215 may include a wide area network (WAN), a storage area network (SAN), a local area network (LAN), an optical fiber network, the internet, or other digital communication network. In some embodiments, the data network 215 may include two or more networks. The data network 215 may include one or more servers, routers, switches, and/or other networking equipment. The data network 215 may also include computer readable storage media, such as a hard disk drive, an optical drive, non-volatile memory, random access memory (RAM), or the like.

Figure 3A:
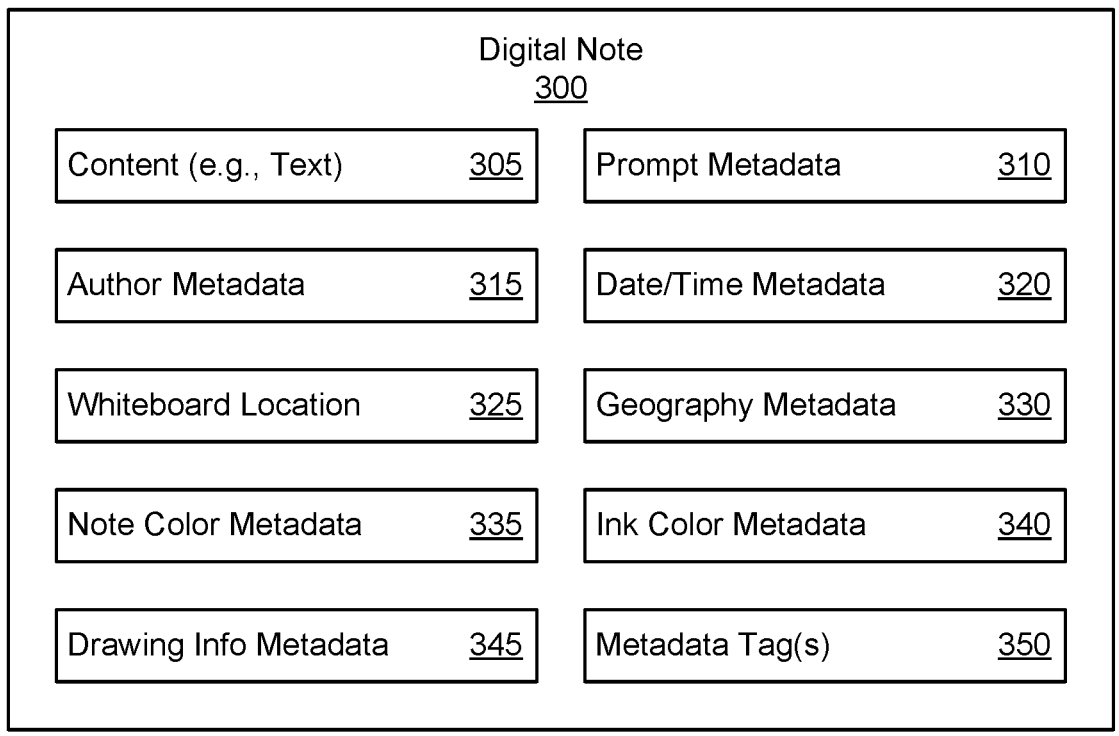
FIG. 3A is a block diagram illustrating one embodiment of a digital note.

FIG. 3A depicts a digital note 300, according to embodiments of the disclosure. The digital note 300 may be one embodiment of the digital notes 120 discussed with reference to FIGS. 1 and 2. As depicted, the digital note 300 includes content 305. The content 305 may be text, handwriting, a doodle/drawing, images, and the like. One embodiment, the content 305 may include a combination of text and image. The digital note 300 also includes various metadata, examples of which include, but are not limited to, prompt metadata 310, author metadata 315, date/time metadata 320, whiteboard location metadata 325, geography metadata 330, note color metadata 335, ink color metadata 340, drawing information metadata 345, and one or more metadata tags 350.

The prompt metadata 310 identifies a writing prompt in effect when the digital note 300 was created. For example, during a brainstorming session, a prompt may be given to the participants and the participants may create digital notes in response to the prompt. Here, the prompt metadata 310 captures the prompt given to the participants when the digital note 300 was made. The author metadata 315 identifies a user (e.g., participant) that created the digital note 300. The date/time metadata 320 identifies a date and time when the digital note 300 was created.

The whiteboard location metadata 325 identifies a location within the digital whiteboard 115 associated with the digital note 300. In one embodiment, the whiteboard location metadata 325 specifies an initial placement of the digital note 300. The whiteboard location metadata 325 may also identify nearby digital notes 120, for example those digital notes 120 within a predefined distance of the digital note 300. The whiteboard location metadata 325 refers to the virtual location of the digital note 300 relative to the interactive interface 130. Where the digital note 300 was created from a physical note, the whiteboard location metadata 325 may be based on an initial placement of the physical note. Additionally, the whiteboard location metadata 325 may identify a current location of the digital note within the digital whiteboard 115 (e.g., within the interactive interface 130).

The geography metadata 330 identifies a physical/geographical location of the user creating the digital note 300 (e.g., a location of the individual identified in the author metadata 315). For example, where participants in a brainstorming session are located in different offices/cities, the geography metadata 330 may identify an office/city where the author is located (e.g., the San Jose office, the Raleigh office, the Beijing office). As another example, where participants in it brainstorming session are located in different rooms the same building/campus, the geography metadata 330 may identify a room number where the author is located (e.g., $10^{th}$ floor conference room, Room #330).

The note color metadata 335 identifies a note color of the digital note 300. For example, a user creating the digital note 300 on a whiteboard client 205 may select this particular color when creating the digital note 300. As another example, where the digital note 300 was created from a physical note, the note color metadata 335 may identify a note color of the physical note as re-created in the digital note 300. Similarly, the ink color metadata 340 identifies any color of the digital note 300. If the digital note 300 was created from physical note, the ink color metadata 340 may identify and ink color used in the physical note. Otherwise, the ink color metadata 340 may identify a color selected when a user creates the digital note 300 on an electronic device.

In certain embodiments, note color and/or ink color may be used to identify a particular author, a particular geographic location, a particular prompt, etc. in such embodiments, the note color metadata 335 and/or the color metadata 340 may be omitted from the metadata of the digital note 300, as this information can be derived from the prompt metadata 310, author metadata 315, geography metadata 330, etc. Alternatively, the prompt metadata 310, author metadata 315, geography metadata 330, etc. may be omitted from the metadata of the digital note 300, as this information can be derived from the note color metadata 335 and/or ink color metadata 340.

The drawing information metadata 345 may be used to indicate whether a drawing, doodle, or image is included in the digital note 300. Where the digital note 300 includes a drawing, doodle, or image, the drawing information metadata 345 may include additional information relating to the drawing, doodle, or image. For example, the drawing information metadata 345 may include metadata describing the drawing, doodle, or image.

In one embodiment, computer vision and/or image analysis tools are used to analyze the drawing/doodle, or image, wherein the drawing information metadata 345 stores the analysis results. For example, computer vision algorithms may identify the drawing is a stick figure person, and this information will be stored within the drawing information metadata 345. As another example, image analysis may be used to detect rough drawings in notes and tag them with metadata (e.g., with metadata describing the drawing, doodle, or image).

Image-related metadata can then be used to sort, filter, and arrange the digital notes. Here, various metadata of the digital note 300 may be generated from the image/drawing (and its analysis).

Consider a plurality of digital notes having both text and hand-drawn favorite animals. The computer vision and image analysis tools are then used to identify the hand-drawings and add relevant drawing information metadata 345 for sorting. Then, in response to user command, the digital notes may be arranged and/or selectively displayed in response to such commands as "Show me dogs," "Show me cats," Show me only cats drawn in red ink," "Filter by animals with feathers," "Filter by carnivores," and the like. Here, the drawing information metadata 345 may indicate whether a digital note belongs to category "dogs," "cats," etc. because of the drawing.

A metadata tag 350 is a label associating the digital note 300 with a topic. A metadata tag 350 may comprise a predefined symbol followed by one or more words identifying/describing the topic. In one embodiment, the metadata tag 350 is a hashtag. Here, the user may include a hashtag with content of the digital note 300. The electronic device 105, digital whiteboard 115, whiteboard client 205, and/or whiteboard server 210 may recognize the hashtag within the digital note 300 and create the metadata tags 350 from the hashtag. Metadata tags 350 discussed in further detail below.

Figure 3B:
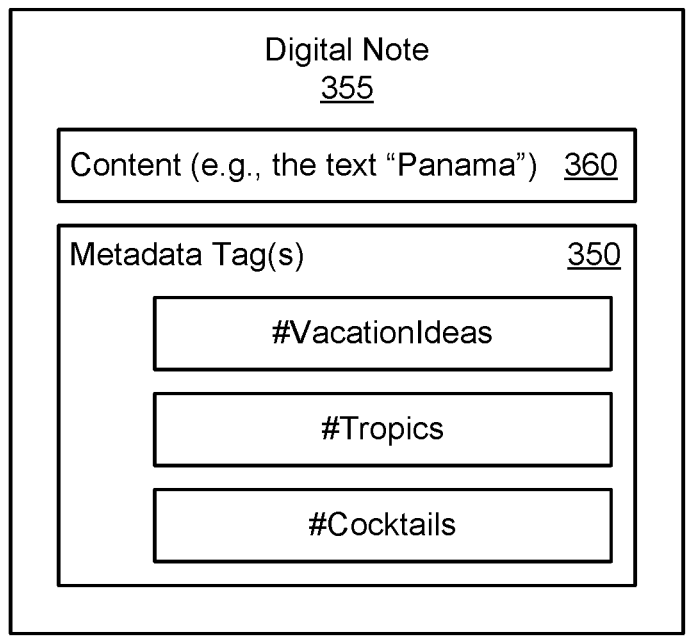
FIG. 3B is a block diagram illustrating another embodiment of a digital note.

FIG. 3B depicts a digital note 355, according to embodiments of the disclosure. Here, the digital note 355 includes content 360 and multiple metadata tags 350. Although not depicted, the digital note 355 may include additional metadata as discussed above with reference to FIG. 3A. The digital note 355 may be one embodiment of a digital note 120 discussed above with reference to FIGS. 1-2 or an embodiment of the digital note 300 discussed above with reference to FIG. 3A.

Here, content 360 of the digital note 355 is the text "Panama." A user may write the text "Panama" in response to a prompt, as discussed above. Here, the text "Panama" is associated with various topics as indicated by the metadata tags 350. As depicted, the metadata tags 350 include the hashtags "#VacationIdeas," "#Tropics," and "#Cocktails."

The topics included in the metadata tags 350 may be identified by the user when creating the digital note 355. For example, the user may include one or more hashtags indicating topics the user considers relevant to the digital note 355. Here, the user may write the hashtag "#VacationIdeas" when creating the digital 0355

In some embodiments, the electronic device 105, digital whiteboard 115, whiteboard client 205, and/or whiteboard server 210 may identify associations (e.g., topics) for the content 360 and stores these associations as metadata tags 350. Here, a computer may generate the hashtags "#Tropics" and "#Cocktails," due to the country Panama being located in a tropical region and "Panama" also being the name of a cocktail drink. In certain embodiments, these computer-generated associations are automatically stored into the metadata of the digital note 355. In other embodiments, a computer-generated association is stored as metadata in response to the digital note 355 being sorted to a category that corresponds to the computer-generated association or in response to user selection of a suggested association.

Figure 4A:
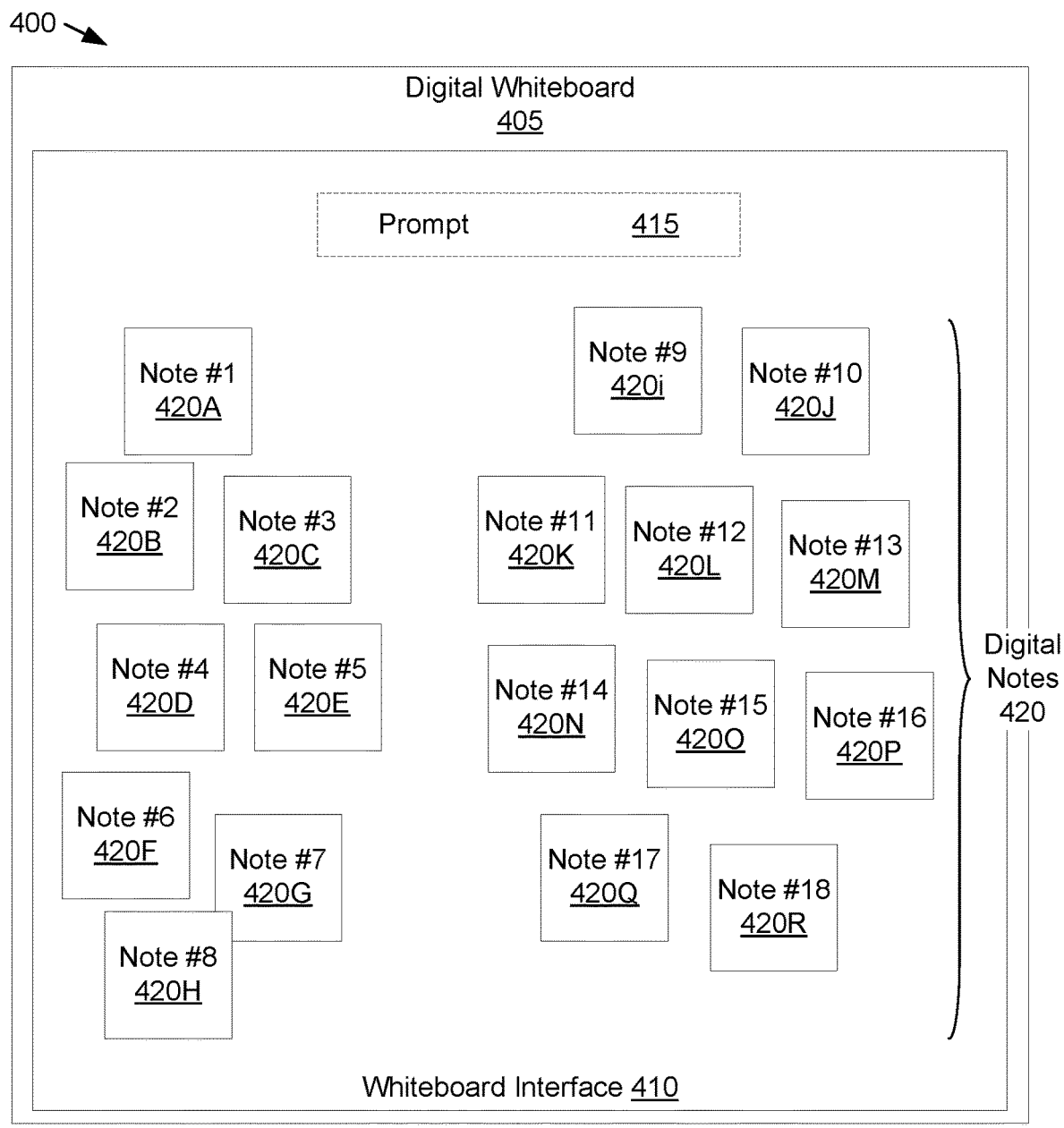
FIG. 4A is a diagram illustrating a digital whiteboard at a first moment in time.
Figure 4B:
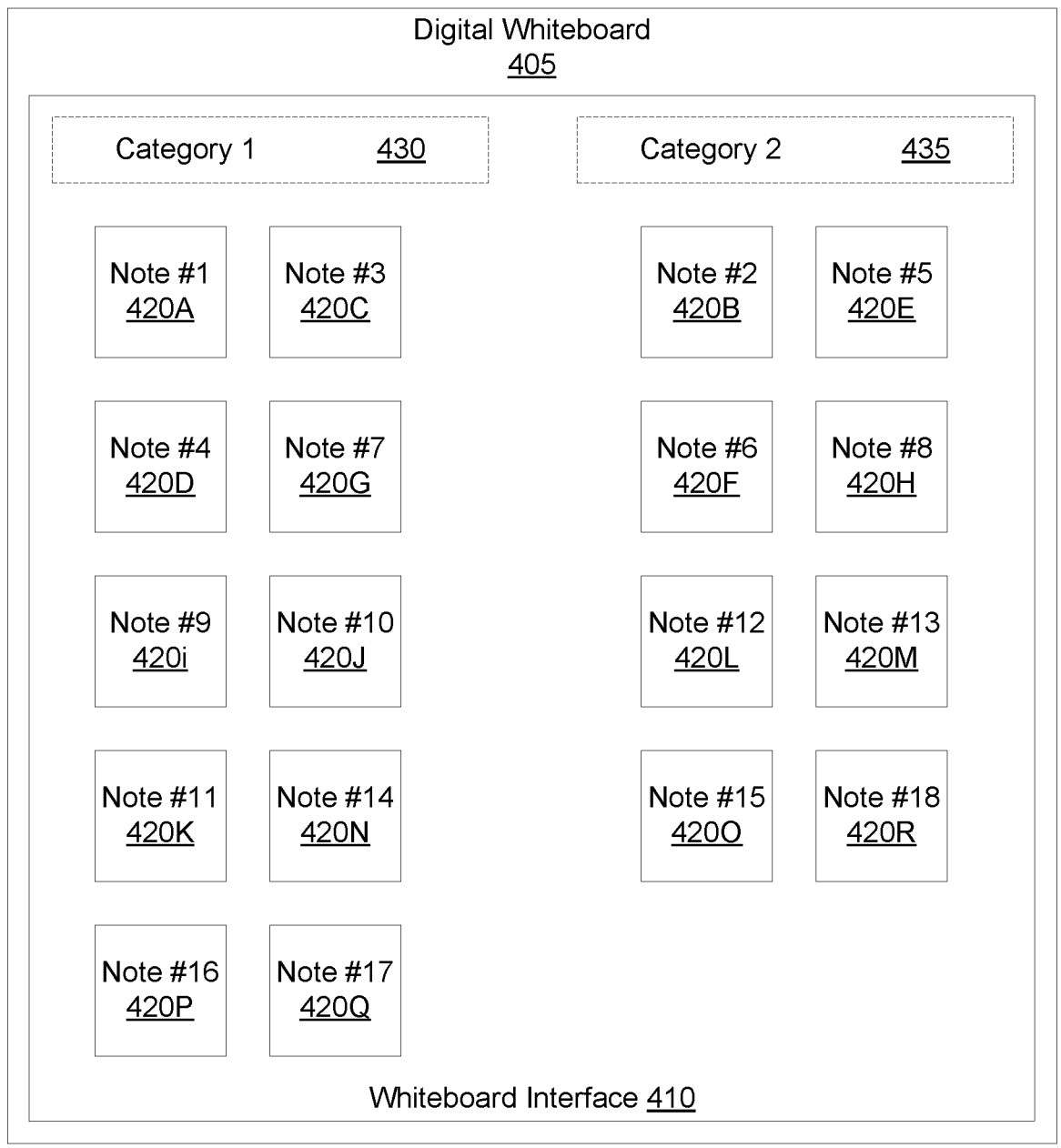
FIG. 4B is a diagram illustrating the digital whiteboard of FIG. 4A at a second moment in time.
Figure 4C:
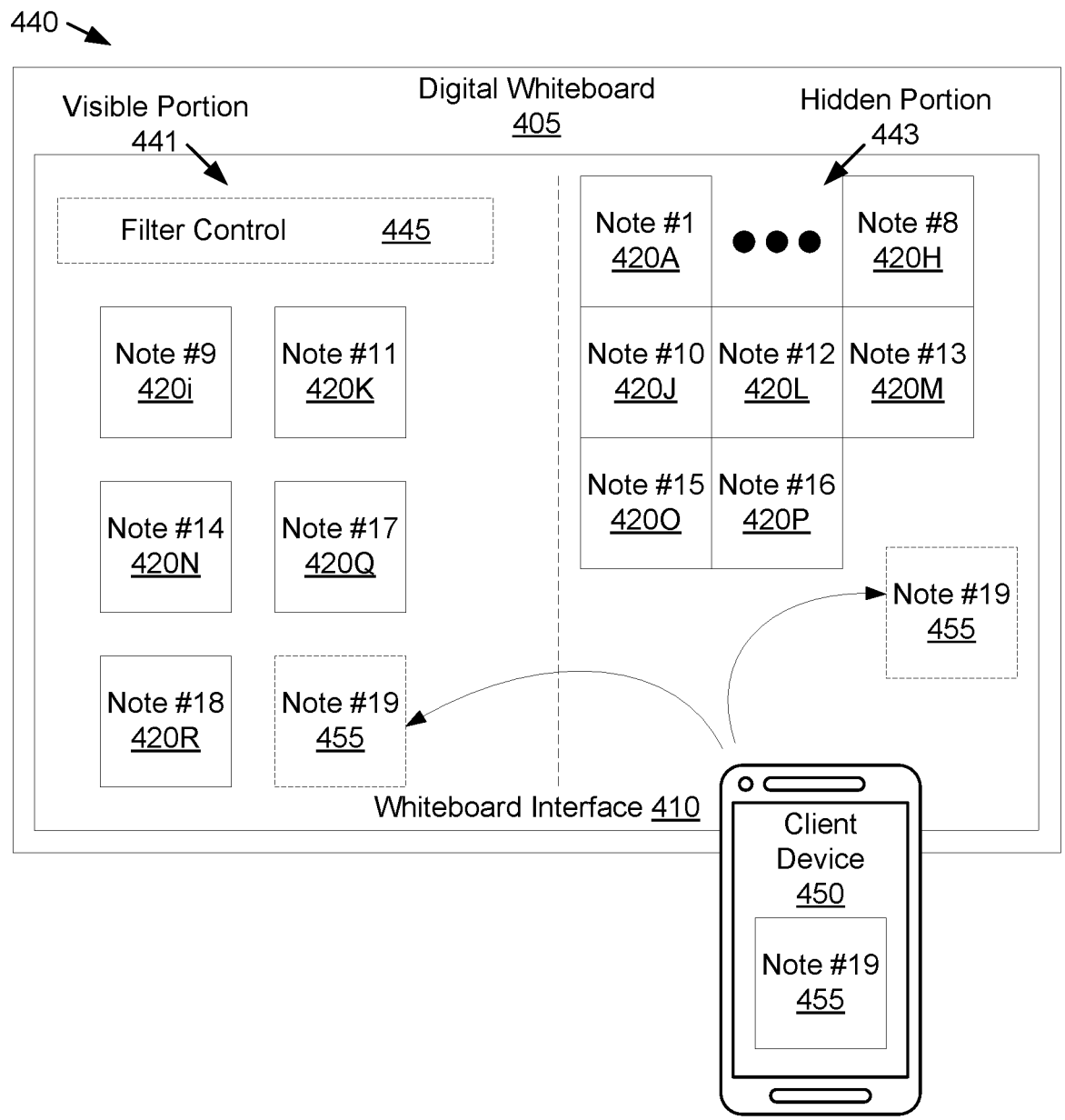
FIG. 4C is a diagram illustrating the digital whiteboard of FIG. 4A at a third moment in time.
Figure 4D:
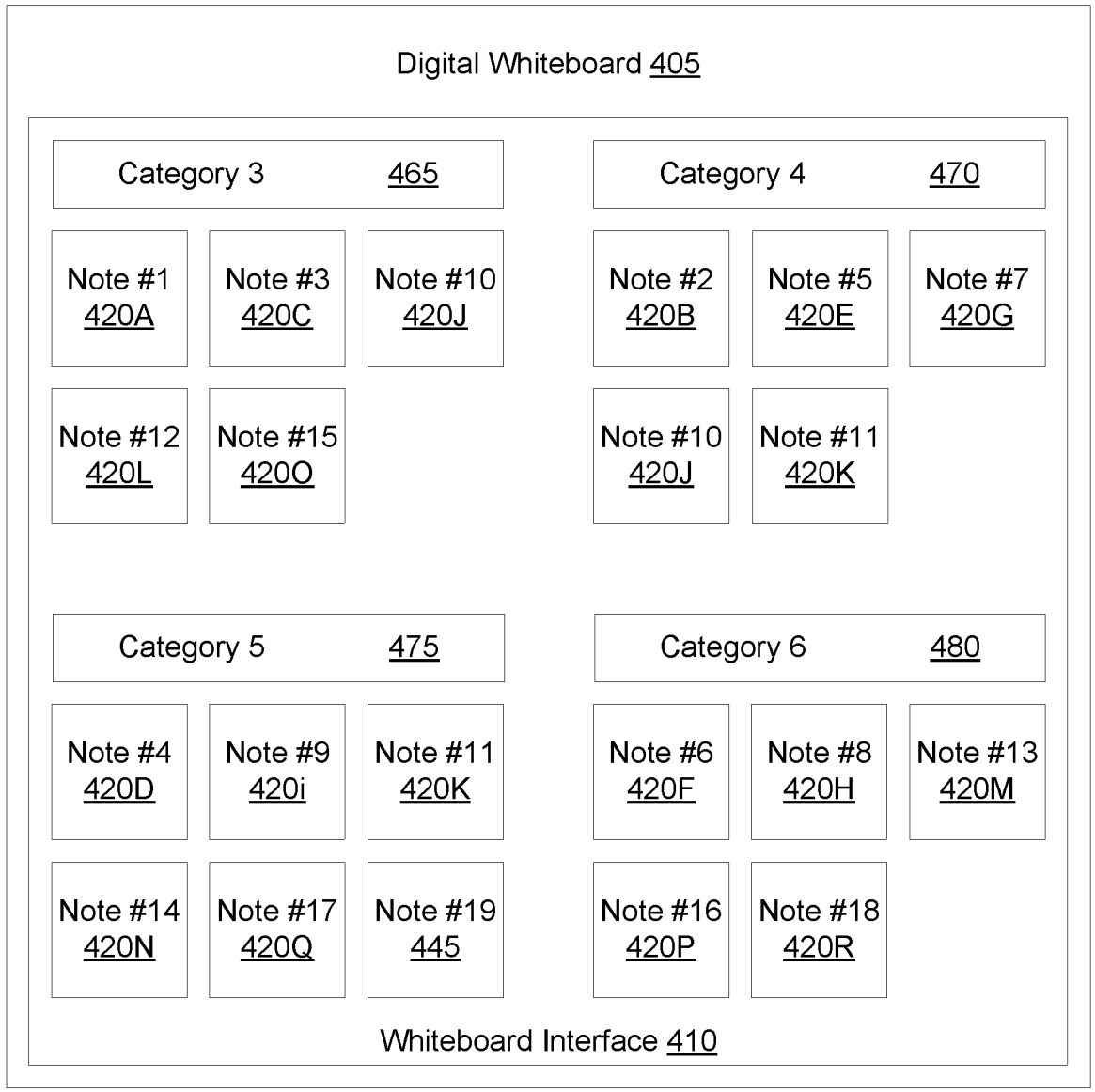
FIG. 4D is a diagram illustrating the digital whiteboard of FIG. 4A at a fourth moment in time.

FIGS. 4A-4D depict various scenarios involving a digital whiteboard 405 used for automatically sorting and displaying digital notes 420, according to embodiments of the disclosure. FIG. 4A depicts the digital whiteboard 405 at a first moment time, FIG. 4B depicts the digital whiteboard 405 at a second moment in time, FIG. 4C depicts the digital whiteboard 405 at a third moment time, and FIG. 4D depicts the digital whiteboard 405 at a fourth moment time. The digital whiteboard 405 is one embodiment of the digital whiteboard 115 described above with reference to FIGS. 1-2.

As depicted, the digital whiteboard 405 includes a whiteboard interface 410. The whiteboard interface 410 may be one embodiment of the interactive interface 130 described above. The user interacts with the whiteboard interface 410 to create, place, edit, remove, and otherwise manipulate digital notes 420. Here, the whiteboard interface 410 includes at least 18 digital notes 420, including a first note 420A, a second note 420B, a third note 420C, a fourth note 420D, a fifth note 420E, a sixth note 420F, a seventh note 420G, an eight note 420H, a ninth note 420i, a tenth note 420J, an eleventh note 420K, a twelfth note 420L, a thirteenth note 420M, a fourteenth note 420N, a fifteenth note 420O, a sixteenth note 420P, a seventeenth note 420Q, and an eighteenth note 420R.

FIG. 4A depicts a first scenario 400, where the digital notes 420 are created and placed within the whiteboard interface 410. The digital notes 420 are associated with a prompt 415. As discussed above, the digital notes 420 may be created in response to the prompt 415. In some embodiments, the prompt 415 is displayed within the whiteboard interface 410. In the first scenario 400 the digital notes 420 are not yet sorted or otherwise categorized. Rather, the first scenario 400 depicts a creation phase. In certain embodiments, the digital whiteboard 405 categorizes the digital notes 420 as they are received by the digital whiteboard 405, but does not sort the digital notes 420 (e.g., arrange by category) within the whiteboard interface 410. As described herein, the digital whiteboard 405 may use language analysis tools to identify topics from the content of each digital note 420. The identified topics and other attributes of the digital notes 420 may be stored as metadata.

FIG. 4B depicts a second scenario 425, where the digital whiteboard 405 visually arranges the digital notes 420 into different categories. As depicted, the plurality of digital notes 420 are sorted into either a first category 430 or a second category 435. Here, the first note 420A, the third note 420C, the fourth note 420D, the seventh note 420G, the ninth note 420i, the tenth note 420J, the eleventh note 420K, the fourteenth note 420N, the sixteenth note 420P, and the seventeenth note 420Q are all sorted into the first category 430. Also, the second note 420B, the fifth note 420E, the sixth note 420F, the eight note 420H, the twelfth note 420L, the thirteenth note 420M, the fifteenth note 420O, and the eighteenth note 420R are all sorted in the second category 435. In certain embodiments, labels corresponding to the first category 430 and the second category 435 are displayed within the whiteboard interface 410.

The digital whiteboard 405 arranges the digital notes 420 into a grid arrangement below each category label. In other embodiments, the digital whiteboard 405 may cluster the digital notes 420 around the category label (e.g., such that the digital notes 420 surround the category label). The digital notes 420 may be or arranged within each category grouping by the date of creation, by author, by relevance (e.g., how close it matches the category), and the like.

FIG. 4C depicts a third scenario 440, where a filter control 445 has been invoked at the digital whiteboard 405. In the depicted embodiment, the whiteboard interface 410 includes a visible portion 441 and a hidden portion 443. The digital notes 420 in the visible portion 441 are displayed to the users, while those digital notes in the hidden portion 443 are not shown, but are still retained in memory. When the filter control 445 is invoked, only a subset of the digital notes 420 are included in the visible portion 441 and thus displayed to the users.

As used herein, filter controls refer to commands that reduce the set of digital notes 420 shown on the whiteboard interface 410. Examples of filter controls 445 include commands to show only notes from certain author, from a certain geographic location, of a certain color, of a certain ink color, of a certain topic/category, of a certain time (range), having specific metadata tags (e.g., hashtags), and the like. As an example of a more advanced filter control, a user may request that the digital whiteboard 405 display those notes having content similar to one another or duplicate content. Here, the digital whiteboard 405 may analyze content of the digital notes 420 to filter out unique and/or dissimilar ideas. In another example of an advanced filter control, the digital whiteboard 405 may only display those digital notes 420 having original or unique content.

Here, the digital notes 420 are compared to the filter control 445 (e.g., compared to parameters in the filter control 445 indicating which notes 420 to include and which to exclude) and the ninth note 420i, the eleventh note 420K, the fourteenth note 420N, the seventeenth note 420Q, and the eighteenth note 420R are displayed (e.g., placed in the visible portion 441). The digital notes 420 that do not meet the filter control 445 requirements are kept in memory, but not displayed (e.g., they are placed in hidden portion 443).

In the third scenario 440, the user operating a client device 450 creates a new digital note, the nineteenth digital note 455. Upon receiving the nineteenth digital note 455, the digital whiteboard 405 determines whether it meets the requirements of the filter control 445. If the nineteenth digital note 455 meets the requirements, it is placed into the visible portion 441 and displayed with the other digital notes 420 that meet the filter control requirements. Otherwise, if the nineteenth digital note 455 does not meet the requirements, it is placed into the hidden portion 443 and is not displayed.

In certain embodiments, a label corresponding to the filter control 445 is displayed within the visible portion 441 of the whiteboard interface 410. For example, the label may describe the filter control 445 or indicate the parameters of the filter control 445. As depicted, the digital notes that meet the requirements of the filter control 445 are displayed beneath the label. In other embodiments, the digital load space around the label. Further, in certain embodiments the visible digital notes 420 may be further sorted into categories or may be arranged in order of creation, based on author, location, and the like.

FIG. 4D depicts a fourth scenario 460, where the digital notes 420 are sorted into a third category 465, a fourth category 470, a fifth category 475, and a sixth category 480. Here, certain of the digital notes 420 are associated with more than one category. As depicted, the tenth note 420J is associated with both the third category 465 and the fourth category 470 and the eleventh note 420K is associated with both the fourth category 470 and the fifth category 475. To show association with multiple categories, a first instance of the tenth note 420J is placed in an area belonging to the third category 465 and a second instance of the tenth note 420J is placed in an area belonging to the fourth category 470. Similarly, one instance of the eleventh note 420K is placed in the area belonging to the fourth category 470 and another instance of the eleventh note 420K is placed in an area belonging to the fifth category 475.

Upon re-sorting the digital notes 420, additional instances of the digital notes 420 may be created (e.g., where a digital note 420 is sorted into multiple categories). Alternatively, instances of the digital notes 420 may be deleted when re-sorting the digital notes 420 (e.g., where a digital note 240 is no longer associated with multiple categories). Each instance of a digital note 420 has the same content and the same metadata as other instances of the same note. In contrast, "duplicate" notes, as used herein, have the same (or substantially similar) content, but different metadata (e.g., different authors, times of creation, etc.).

Figure 5:
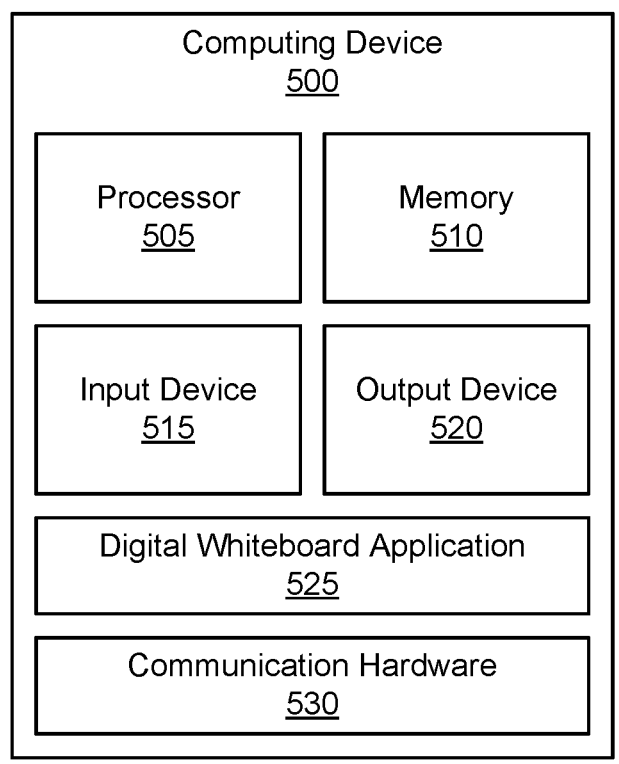
FIG. 5 is a schematic block diagram illustrating one embodiment of a computing device for sorting and displaying digital notes on a digital whiteboard.

FIG. 5 depicts a computing device 500 for sorting and displaying digital notes on a digital whiteboard, according to embodiments of the disclosure. In some embodiments, the computing device 500 is a user terminal device, such as a personal computer, mainframe, server, terminal station, laptop computer, desktop computer, tablet computer, smart phone, personal digital assistant, and the like. In one embodiment, the computing device 500 is one embodiment of the electronic device 105, described above. In another embodiment, the computing device 500 is one embodiment of the digital whiteboard 115, described above.

The computing device 500 includes a processor 505, a memory 510, an input device 515, and an output device 520. In some embodiments, the computing device 500 may include a digital whiteboard application 525 and/or communication hardware 530. In one embodiment, the digital whiteboard application is a whiteboard client application used to interact with a digital whiteboard (e.g., the digital whiteboard 115 and/or 405). In such an embodiment, the computing device 500 may function as a whiteboard client 205. In another embodiment, the digital whiteboard application is a whiteboard server application used to provide (host) a digital whiteboard (e.g., the digital whiteboard 115 and/or 405). In such an embodiment, the computing device 500 may function as a whiteboard server 210 or as a standalone digital whiteboard.

In certain embodiments, the computing device 500 includes an imaging device, such as a scanner, camera, digitizer, or other imager, that captures image data representing a digital note. For example, the computing device 500 may capture image data representative of a physical note and perform, e.g., optical character recognition ("OCR") on the note to identify its content. In other embodiments, the computing device 500 may be communicatively coupled to an external imaging device that captures image data representing a digital note (not shown).

The processor 505, in one embodiment, may comprise any known controller capable of executing computer-readable instructions and/or capable of performing logical operations. For example, the processor 505 may be a microcontroller, a microprocessor, a central processing unit (CPU), a graphics processing unit (GPU), an auxiliary processing unit, a FPGA, an integrated circuit, or similar controller. In certain embodiments, the processor 505 may include multiple processing units, such as multiple processing cores, multiple CPUs, multiple microcontrollers, or the like. In some embodiments, the processor 505 executes instructions stored in the memory 510 to perform the methods and routines described herein. The processor 505 is communicatively coupled to the memory 510, input device 515, output device 520, and communication hardware 530.

The processor 505 receives a plurality of digital notes. The digital note may be created by a user of the digital whiteboard. In one embodiment, the digital note is a scan of a physical note, such as a sticky note. Here, the processor 505 may be coupled to a camera, a scanner, an imager, or the like, with creates a digital image from the physical note. In another embodiment, the digital note is created on an electronic device. Here, the note may be handwritten (e.g., using a stylus, finger, or the like on a touch-sensitive surface), typed, dictated by voice, or the like.

In certain embodiments, the processor 505 operates on an initial set of digital notes. One or more digital notes may be added to the initial set, for example, added to the set real-time as the user creates the digital note. The processor 505 associates metadata with each note an initial set. Further, the processor 505 may analyze content of the notes and associated metadata with the notes as each note is added to the set.

The processor 505 identifies a plurality of categories into which the digital notes are to be sorted. In one embodiment, multiple categories are defined prior to receiving the digital notes. In another embodiment, one or more categories are defined after at least some of the digital notes are received. The categories may be user-defined or automatically generated, as discussed below.

Additionally, a particular digital note may be associated with more than one category. For example, a digital note with the content of "deer" may be associated with the categories (e.g., topics) "animals," "nuisance," "hunting," "collisions," "place names," and the like. Further, each topic (or category) may have multiple subtopics (or subcategories) with which the digital note may also be associated. Continuing the above example, for the category of "animals" the digital note ("deer") may be associated with the subcategories of mammals, herbivores, wildlife, and the like.

During a brainstorming session, multiple participants (e.g., users of the digital whiteboard) may generate the digital notes in response to a prompt. Separate from the prompt, the digital notes may be associated with certain topics. In many scenarios a digital note is associated with multiple topics. The processor 505 may identify the topics using language processing tools, including natural language algorithms. In certain embodiments, an author may indicate at least one topic to which the digital note belongs in the content (e.g., text) of the note. In one embodiment, the user may use a metadata tag, such as a hashtag, to indicate the topic.

These topics become candidate categories, for example for future sorting, filtering, and/or categorization of the digital notes. In certain embodiments, identifying the plurality of categories include selecting one or more of the candidate categories. In one scenario, the user may indicate (e.g., sua sponte or in response to a prompt from the processor 505) one or more of the candidate categories for inclusion in the plurality of categories. As discussed below, a user may use a metadata tag indicated topic (e.g., a user-indicated topic) associated with the digital note. In other scenarios, the processor 505 may automatically select one or more of the candidate categories for inclusion in the plurality of categories. Here, the processor 505 may select a specific number of candidate categories based on popularity (e.g., the number of digital notes associated with the candidate category), relevance to a prompt, or the like.

The processor 505 sorts each digital note with at least one category based on metadata associated with (e.g., belonging to) each digital note. For example, the processor 505 may determine, for each identified category, whether it digital note belongs to that category. In some embodiments, a digital note is associated with the one category at a time (e.g., only one of the identified categories). Here, only one copy of the digital note will be displayed on the digital whiteboard. If the digital note could belong to more than one category, the processor 505 may select a most relevant category with which to associate the digital note. In other embodiments, a digital note may be associated with multiple categories at a time. Here, duplicates of the digital note may be displayed on the digital whiteboard, for example one copy at each location associated with an identified category.

In some embodiments, the metadata is derived from the content of the digital note. For example, text an additional note may be analyzed to identify one or more topics, as discussed above. The metadata they also describe additional properties of the digital note, such as author, time of creation, geography (e.g., physical location where the digital note was created), and the like, which may be used to sort each digital note (e.g., categorized by creator). Examples of metadata include, but are not limited to, a time of creation, an author, an ink color, a note color, a geographic location, initial placement on the digital whiteboard (including location relative to other digital notes), a topic (e.g., generated using language analysis), a prompt associated with the note, and a user-supplied metadata tag (e.g., relating to topic or category).

The processor 505 displays, on the digital whiteboard, each of the plurality of digital notes at a location based on the determined at least one category for each digital note. The placement of the digital note visually indicates its association with a category. In this manner, the processor 505 visually groups notes with category. In some embodiments, each category may have its own region within the digital whiteboard and digital notes associated with the category will be placed within the region. For example, each category may have one or more columns within the digital whiteboard and digital notes belonging to the category will be placed into a corresponding column.

In certain embodiments, the digital note may be emphasized. In some embodiments, the digital note may be highlighted, its size enlarged (or reduced), it is text size enlarged (or reduced), it is text placed in bold, italics, underlined, and the like in order to emphasize the association of the digital note with a category. In this manner, a digital note that is particularly relevant (e.g., a best match to the category) may be visually distinguished over other digital notes within the category. As another example, language processing tools may be used to identify a degree to which the digital note matches the category and digital notes matching to a greater degree are displaced with larger size while digital notes matching to a lesser degree are displaced with reduced size.

In some embodiments, relationships between the digital notes may be indicated on the digital whiteboard. For example, all notes created by the same user may have the same background (e.g., note) color, the same text (or ink) color, may use the same font, may have the same font characteristics, or the like. As another example, where participants in a brainstorming session are located in different offices, all users at a first office may have digital notes with a first background color, and users at a second office will have digital notes with a second background color. In one embodiment, digital notes within a category may be grouped by subcategory within the space allocated to that category. In another embodiment, notes expressing similar content may be visually linked on the digital whiteboard.

In one embodiment, the digital whiteboard is a shared digital whiteboard and the plurality of digital notes are received from a plurality of users (e.g., participants in a brainstorming session). As discussed above, the plurality of users may be located in two more geographic locations. In the multiuser environment, authorship of the note may be of particular relevance. Therefore, the processor 505 may associate metadata with each digital note that indicates an author of the note (e.g., the user that created the note).

In some embodiments, receiving a plurality of digital notes comprises receiving a handwritten note. Here, the processor 505 may digitize (or receive a digitized version) of the handwritten note. For example, the apparatus may include an imaging device, such as a camera, a scanner, a digitizer, or other device for capturing content of the handwritten note as image data. In such embodiments, the processor 505 converts handwriting in the handwritten note into text.

Here, the processor 505 may apply optical character recognition routines to convert the image data (e.g., handwritten characters in the handwritten note) into text. In one embodiment, the converting the handwriting includes identifying a Unicode character that corresponds to a handwritten character. Accordingly, the text may be a series of Unicode characters that correspond to the handwriting.

Further, the processor 505 identifies, for each digital note, at least one topic from the content (e.g., text) of the digital note. The processor 505 also associated metadata with each digital note, the metadata including the at least one identified topic. Continuing the above example, the processor 505 identifies at least one topic of the digitized handwritten note by examining the text corresponding to the handwriting. In another example, the text a typed note is also examined to identify at least one topic for the typed note. In some embodiments, identifying plurality of categories includes identifying a sufficient number of categories such that each digital note belongs to at least one of the plurality of categories.

Identifying a topic for a digital note may include using natural language processing algorithms to interpret the content (e.g., text) of the digital note. In certain embodiments, a digital note may include a drawing, doodle, or other user-input image. Here, one or more computer vision algorithms may be used to interpret the drawing, doodle, etc. and to identify a topic associated with the user-input image. Additionally, identifying the topic for a digital note may include examining metadata of the digital note, including a current prompt from when the note was created, user indication of topic, content of nearby notes (nearby in time and/or in whiteboard position), and the like. The metadata of a digital note is discussed with reference to FIGS. 3A-3B.

In certain embodiments, the processor 505 adds a metadata tag or label, upon identifying a topic for a digital note. Here, the metadata tag may indicate a category or subcategory to which the digital note belongs (e.g., as determined based, at least in part, on the identified topic). Alternatively, the metadata tag may describe the topic, so that the tag can be used to categorize the digital note into one of the identified categories. Similarly, the processor 505 may add a metadata tag to a digital note upon categorizing the digital note into one of the identified categories. This metadata tag may indicate a category or sub-category to which the digital note belongs.

In some embodiments, identifying a plurality of categories includes the processor 505 identifying metadata tags belonging to the digital notes. For example, the user may place (e.g., manually enter) metadata tags indicating categories to which the user considers the digital notes belong. In such embodiments, the metadata tags correspond to the categories. In one embodiment, the user-input text content of the digital note includes the metadata tag, for example prefaced with a hash symbol ("#") or other predefined symbol. Here, the metadata tag prefaced by the hash symbol is referred to as a "hashtag." The user-placed metadata tag (e.g., hashtag) may be handwritten (e.g., in the case of a handwritten note), typed, or entered in response to user command (e.g., voice dictation).

In certain embodiments, the processor 505 identifies the categories by searching the set of digital notes for hashtags or other user-placed metadata tags, wherein the user-placed metadata tags become candidate categories for the set of digital notes. Here, identifying the plurality of categories includes selecting at least one of the candidate categories. In further embodiments, in response to associating the digital note with a particular category, the processor 505 adds hashtags or other metadata tags to each digital note indicating the associated category.

In certain embodiments, identifying a plurality of categories includes the processor 505 suggesting one or more categories to the user based on content from the plurality of digital notes and receiving user selection of at least one suggested category. Here, the identified plurality of categories includes the at least one user-selected category. For example, the processor 505 may use natural language processing or other language processing algorithms to identify topics to which the content (e.g., text) of the digital notes relate. When a certain topic relates to a sufficient number of digital notes (e.g., above a threshold number of notes), then the processor 505 may suggest the topic as a category. The user may accept or ignore the suggestion.

The processor 505 is configured to automatically sort the digital notes into categories and display the digital notes in a manner that visually indicates the categorization. In one embodiment, there is an initial set of categories into which each digital note is placed. Here, as each digital note is created, the processor 505 identifies at least one category in the initial set of categories for placing the created note. In some embodiments, the processor 505 operates in real-time to dynamically sort the digital notes as they are created. In certain embodiments, the processor 505 operates on a set of previously created digital notes. For example, during a brainstorming session or prop may be given wherein each participant begins to create digital notes. After preset amount of time, no creation may end and the processor 505 will sort the notes into categories (e.g., into a category of the initial set of categories).

In some embodiments, the processor 505 receives a user command and rearranges the digital notes within the digital whiteboard in response to the user command. For example, the user command may be a request to rearrange the digital notes into new set of categories (e.g., user-specified categories). Here, the processor 505 sorts the digital notes into the new set of categories and visually presents the digital notes in specific locations on the digital whiteboard based on the new categorization. As another example, the user command may redefine the categories into which the digital notes are to be sorted.

In certain embodiments, the processor 505 displays only a subset of the plurality of digital notes on the digital whiteboard in response to the user command invoking a filter control. Filter controls may be used to reduce the number of digital notes displayed on the digital whiteboard. In one embodiment, filter controls may operate based on metadata included with the digital note. For example, the user command may be a request to show only those digital notes belong to certain categories. As another example, the user command may be a request to show only those digital notes created by certain authors. In another embodiment, the filter controls may operate based on analysis of content of the digital notes. For example, the user command may be requested show only those digital notes whose content blunts to certain subcategories or topics.

The memory 510, in one embodiment, is a computer readable storage medium. In some embodiments, the memory 510 includes volatile computer storage media. For example, the memory 510 may include a random-access memory (RAM), including dynamic RAM (DRAM), synchronous dynamic RAM (SDRAM), and/or static RAM (SRAM). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media.

In some embodiments, the memory 510 stores data relating to sorting and displaying digital notes on a digital whiteboard. For example, the memory 510 may store digital notes, categories, candidate categories, user selections, metadata, and the like. In some embodiments, the memory 510 also stores executable code and related data, such as an operating system or other controller algorithms operating on the computing device 500.

The input device 515, in one embodiment, may comprise any known computer input device including a touch panel, a button, a keyboard, a microphone, a camera, and the like. For example, the input device 515 may include a microphone or similar audio input device with which a user inputs sound or voice data (e.g., voice commands). In some embodiments, the input device 515 (or portion thereof) may be integrated with the output device 520, for example, as a touchscreen or similar touch-sensitive display. In some embodiments, the input device 515 comprises two or more different devices, such as a microphone and a touch panel. The input device 515 may include a camera for capturing images or otherwise inputting visual data.

The output device 520, in one embodiment, is configured to output visual, audible, and/or haptic signals. In some embodiments, the output device 520 includes an electronic display capable of outputting visual data to a user. For example, the output device 520 may include an LCD display, an LED display, an OLED display, a projector, or similar display device capable of outputting images, text, or the like to a user. In certain embodiments, the output device 520 includes one or more speakers for producing sound, such as an audible alert or notification. In some embodiments, the output device 520 includes one or more haptic devices for producing vibrations, motion, or other haptic output.

In some embodiments, all or portions of the output device 520 may be integrated with the input device 515. For example, the input device 515 and output device 520 may form a touchscreen or similar touch-sensitive display. As another example, the input device 515 and output device 520 may form a display that includes haptic response mechanisms. In other embodiments, the output device 520 may be located near the input device 515. For example, a camera, microphone, speakers, and touchscreen may all be located on a common surface of the computing device 500. The output device 520 may receive instructions and/or data for output from the processor 505 and/or the communication hardware 530.

The communication hardware 530, in one embodiment, is configured to send and to receive electronic communications. The communication hardware 530 may communicate using wired and/or wireless communication links. In some embodiments, the communication hardware enables the computing device 500 to communicate via the data network 215. The computing device 500 may also include communication firmware or software, including drivers, protocol stacks, and the like, for sending/receiving the electronic communications. In certain embodiments, the communication hardware 530 includes a wireless transceiver capable of exchanging information via electromagnetic radiation (e.g., communication via radio frequencies, infrared, visible light, and the like) or sound (e.g., ultrasonic communication). In certain embodiments, the communication hardware 530 includes a wired transceiver capable of exchanging information via a transmission line (e.g., wire, data cable, or optical fiber).

Figure 6:
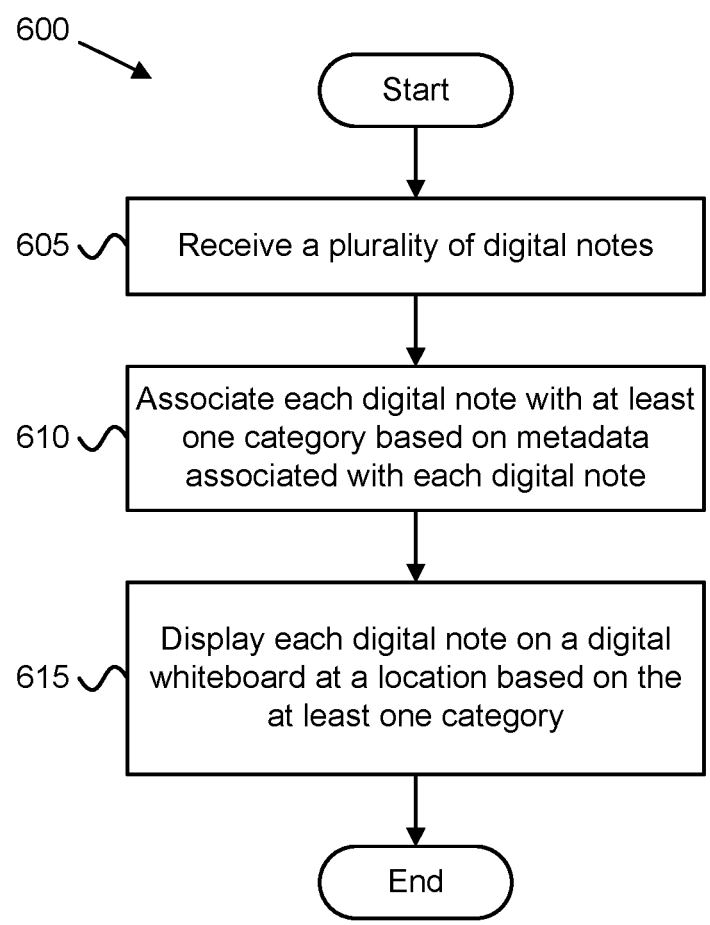
FIG. 6 is a schematic flow chart diagram illustrating one embodiment of a method for sorting and displaying digital notes on a digital whiteboard.

FIG. 6 depicts a method 600 for sorting and displaying digital notes on a digital whiteboard, according to embodiments of the disclosure. In one embodiment, the method 600 is performed by the digital whiteboard 115. In another embodiment, the method 600 may be performed by a whiteboard server 210 or a computing device 500 that hosts a digital whiteboard 115. Alternatively, the method 600 may be performed by a processor and a computer readable storage medium, such as the processor 505 and memory 510. The computer readable storage medium may store code that is executed on the processor 505 to perform the functions of the method 600.

The method 600 begins and receives 605 a plurality of digital notes. The digital notes may be received 605 from an input device of an electronic device 105, from a whiteboard client 205, or via an input device 515 of the digital whiteboard 115. In some embodiments, receiving 605 the digital notes includes receiving one or more digital notes in real-time.

The method 600 includes identifying 610 a plurality of categories. In one embodiment, identifying 610 the plurality of categories includes accessing predefined categories. In another embodiment, identifying 610 the plurality of categories may include deriving one or more categories by analyzing content of the digital notes. In such an embodiment, at least one category may be identified in response to user selection of a computer-generated candidate category.

The method 600 includes associating 610 each digital note with at least one category of a plurality of categories based on metadata associated with (e.g., belonging to) each digital note. The metadata may include topics derived by analyzing content of the digital notes. In some embodiments, the metadata includes one or more metadata tags, such as a user-input hashtag. In certain embodiments, the metadata may include one or more of a time of creation, an author, an ink color, a note color, a geographic location, a topic, a prompt associated with the note, and a user-supplied category.

The method 600 includes displaying 620 each of the plurality of digital notes on a digital whiteboard at a location based on the determined at least one category for each digital note. In some embodiments, displaying 620 each of the plurality of digital notes on a digital whiteboard includes visually arranging the digital notes within the digital whiteboard to show their association with one or more of the identified categories. The method 600 ends.

Figure 7:
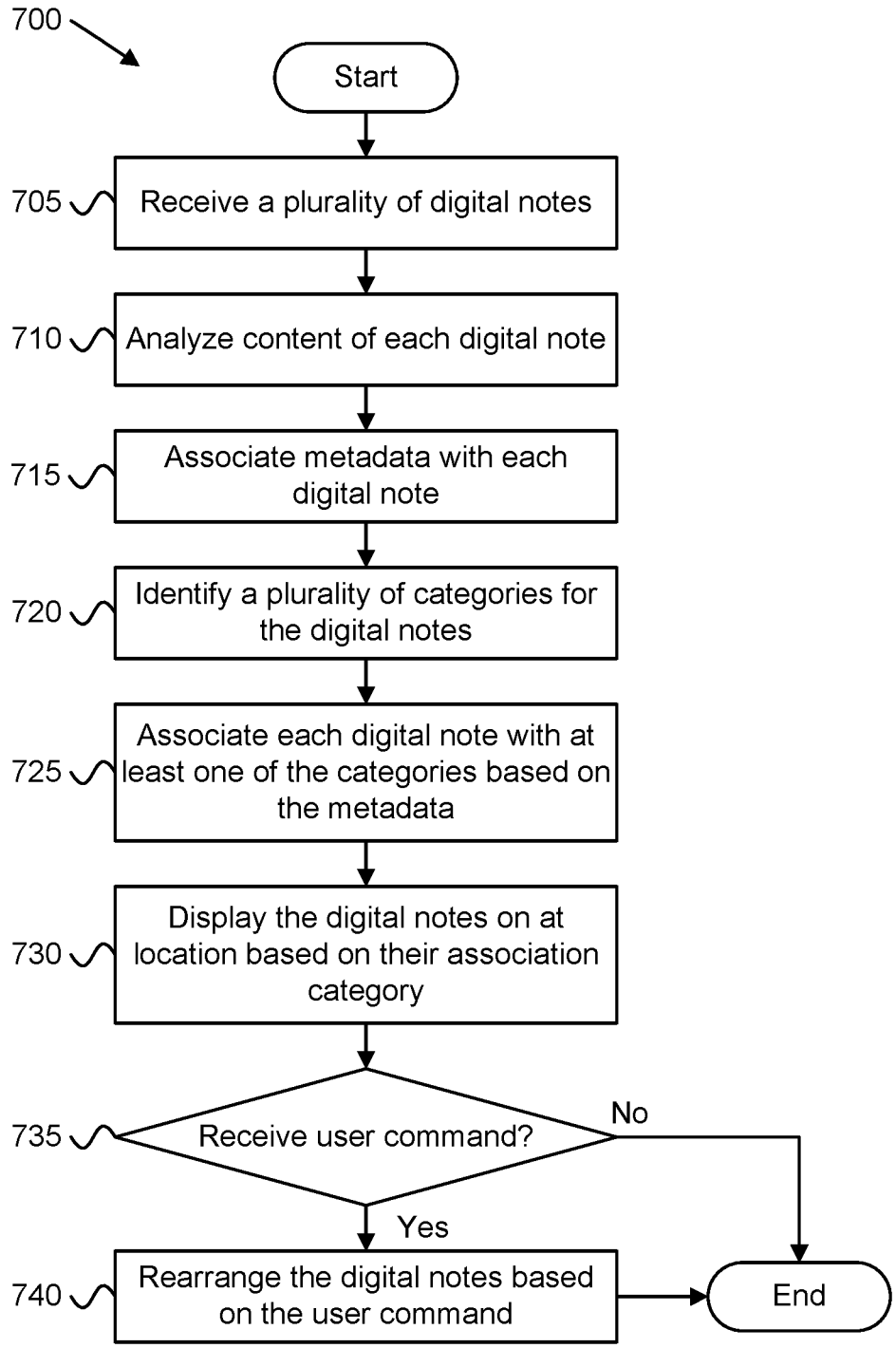
FIG. 7 is a schematic flow chart diagram illustrating another embodiment of a method for sorting and displaying digital notes on a digital whiteboard.

FIG. 7 depicts a method 700 for sorting and displaying digital notes on a digital whiteboard, according to embodiments of the disclosure. In one embodiment, the method 700 is performed by the digital whiteboard 115. In another embodiment, the method 700 may be performed by the whiteboard server 210 or the computing device 500. Alternatively, the method 700 may be performed by a processor and a computer readable storage medium, such as the processor 505 and memory 510. The computer readable storage medium may store code that is executed on the processor 505 to perform the functions of the method 700.

The method 700 begins and receives 705 a plurality of digital notes. The digital notes may be received 705 from an input device of an electronic device 105, from a whiteboard client 205, or via an input device 515 of the digital whiteboard 115. In some embodiments, receiving 705 the digital notes includes receiving one or more digital notes in real-time. In certain embodiments, receiving 705 the digital notes includes receiving one or more image representative of handwritten notes. Where a digital note is a digitized version of a physical note, receiving 705 the digital notes includes performing an optical character recognition to identify text of the note.

The method 700 includes analyzing 710 content of the digital notes. In some embodiments, analyzing 710 content of the digital notes includes deriving one or more topics associated with the digital note. In certain embodiments, analyzing 710 content of the digital notes includes using computer vision algorithms to interpret a drawing, doodle, or other image in the content of the note. In one embodiment, analyzing 710 content of the digital notes includes identifying one or more user-input metadata tags, such as a hashtag, included with the content.

The method 700 includes associating 715 metadata with each digital note. In some embodiments, associating 715 metadata with each digital note includes storing the topics (e.g., derived from the analysis) as metadata for the digital note. In certain embodiments, associating 715 metadata with each digital note includes storing the one or more metadata tags. In further embodiments, associating 715 metadata with each digital note includes storing one or more of a time of creation, an author, an ink color, a note color, a geographic location, a topic, a prompt associated with the note, and a user-supplied category.

The method 700 includes identifying 720 a plurality of categories. In one embodiment, identifying 720 the plurality of categories includes unedifying one or more categories defined prior to creation of the digital notes. In another embodiment, identifying 720 the plurality of categories may include deriving one or more categories from the content of the digital notes. In such an embodiment, at least one category may be identified in response to user selection of a computer-generated candidate category.

The method 700 includes associating 725 each digital note with at least one category based on metadata associated with (e.g., belonging to) each digital note. In some embodiments, metadata (including derived topics) is compared to the selected categories to determine whether a digital note is a match with the category. The method 700 includes displaying 730 each of the plurality of digital notes on a digital whiteboard at a location based on the determined at least one category for each digital note. In some embodiments, displaying 730 each of the plurality of digital notes on a digital whiteboard includes visually arranging the digital notes within the digital whiteboard to show their association with one or more of the identified categories.

The method 700 includes determining 735 whether a user command is received and rearranging 740 the digital notes based on the user command. Otherwise, the method 700 ends. Here, rearranging 740 the digital notes based on the user command may include re-sorting the digital notes into newly selected categories and displaying the digital notes in new locations based on the new categories.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
  a processor; and
  a memory that stores code executable by the processor to:
    receive a plurality of digital notes;

analyze content of the digital notes, the content comprising user input responsive to a prompt provided to users, the prompt intended to elicit content for the notes from the users;
capture the prompt in prompt metadata for the digital notes when the digital notes are made;
determine metadata for the digital notes, the metadata based on the analysis of the content of the digital notes and based on properties of the digital notes, the properties of the digital notes comprising the prompt metadata;
generate a metadata tag for each digital note based on the metadata determined according to the analysis of the content, wherein the metadata tag indicates a topic to which the digital note relates;
associate each digital note with at least one category of a plurality of categories based on metadata of each digital note; and
arrange the plurality of digital notes into visual clusters on a digital whiteboard by displaying each of the plurality of digital notes at a location based on the at least one category, wherein:
multiple instances of a digital note that is associated with multiple categories that are presented on the digital whiteboard are created and visually associated with each of the multiple categories, each of the multiple instances of the digital note having the same metadata based on the properties of the digital note; and
in response to re-sorting the digital notes presented on the digital whiteboard, deleting an instance of the multiple instances of the digital note in response to the category that the instance of the digital note is associated with no longer being displayed on the digital whiteboard.

2. The apparatus of claim 1, wherein receiving a plurality of digital notes comprises receiving a handwritten note, wherein the processor further:
converts handwriting in the handwritten note into text;
identifies, for each digital note, at least one user-supplied topic from text of the digital note, wherein the metadata tag includes the user-supplied topic; and
associates metadata with each digital note.

3. The apparatus of claim 1, wherein the processor associates each digital note with at least one category of the plurality of categories based on the metadata tags.

4. The apparatus of claim 1, wherein the processor further:
suggests one or more categories to a user based on content from the plurality of digital notes;
receives user selection of at least one suggested category; and
identifies the plurality of categories including the at least one user-selected category.

5. The apparatus of claim 1, wherein the processor further:
receives a user query; and
rearranges the digital notes within the digital whiteboard in response to the user query,
wherein the processor further displays only a subset of the plurality of digital notes on the digital whiteboard in response to the user query invoking a filter.

6. The apparatus of claim 1, wherein at least one digital note includes an image or drawing, wherein the processor further analyzes the image or drawing and tags the at least one digital note including an image or drawing with metadata describing the image or drawing, wherein associating each digital note with at least one category based on metadata of digital note comprises the processor sorting the at least one digital note including an image or drawing into a category based on the metadata describing the image or drawing.

7. The apparatus of claim 6, wherein the metadata describing the image or drawing is generated from the image or drawing.

8. A method comprising:
receiving, by use of a processor, a plurality of digital notes;
analyzing content of the digital notes, the content comprising user input responsive to a prompt provided to users, the prompt intended to elicit content for the notes from the users;
capturing the prompt in prompt metadata for the digital notes when the digital notes are made;
determining metadata for the digital notes, the metadata based on the analysis of the content of the digital notes and based on properties of the digital notes, the properties of the digital notes comprising the prompt metadata;
generating a metadata tag for each digital note based on the metadata determined according to the analysis of the content, wherein the metadata tag indicates a topic to which the digital note relates;
associating each digital note with at least one category of a plurality of categories based on metadata of each digital note; and
arranging the plurality of digital notes into visual clusters by displaying each of the plurality of digital notes on a digital whiteboard at a location based on the at least one category, wherein:
multiple instances of a digital note that is associated with multiple categories that are presented on the digital whiteboard are created and visually associated with each of the multiple categories, each of the multiple instances of the digital note having the same metadata based on the properties of the digital note; and
in response to re-sorting the digital notes presented on the digital whiteboard, deleting an instance of the multiple instances of the digital note in response to the category that the instance of the digital note is associated with no longer being displayed on the digital whiteboard.

9. The method of claim 8, wherein receiving a plurality of digital notes comprises receiving a handwritten note, wherein the method further comprises:
converting handwriting in the handwritten note into text;
identifying at least one user-supplied topic from the text, wherein the metadata tag indicates the user-supplied topic; and
associating metadata with the handwritten note.

10. The method of claim 8, further comprising associating one or more subcategories with each digital note based on the analysis of its content, each subcategory belonging to one of the identified plurality of categories.

11. The method of claim 8, further comprising:
associating metadata with each digital note based on analysis of the contents of each digital note; and
receiving a user command specifying the plurality of categories, wherein associating each digital note with at least one category comprises sorting each digital note into one or more of the user-specified plurality of categories based on the metadata.

12. The method of claim 8, further comprising:
suggesting one or more categories to a user based on content from the plurality of digital notes;

receiving user selection of at least one suggested category; and identifying the plurality of categories including the at least one user-selected category.

13. The method of claim 8, further comprising receiving a user command; and rearranging the digital notes in response to the user command.

14. The method of claim 13, further comprising displaying only a subset of the plurality of digital notes in response to the user command invoking a filter.

15. The method of claim 8, further comprising:

associating metadata with each digital note in response to receiving the digital note, wherein the metadata is selected from the group consisting of a time of creation, an author, an ink color, a note color, a geographic location, a topic, a prompt associated with the digital note, and a user-supplied category.

16. A program product comprising a computer readable storage medium that is not a transitory signal and that stores code executable by a processor, the executable code comprising code to perform:

receiving a plurality of digital notes;

identifying a plurality of categories, wherein identifying the plurality of categories comprises analyzing content of each digital note, the content comprising user input responsive to a prompt provided to users, the prompt intended to elicit content for the notes from the users;

capturing the prompt in prompt metadata for the digital notes when the digital notes are made;

determining metadata for the digital notes, the metadata based on the analysis of the content of the digital notes and based on properties of the digital notes, the properties of the digital notes comprising the prompt metadata;

generating a metadata tag for each digital note based on the metadata determined according to the analysis of the content, wherein the metadata tag indicates a topic to which the digital note relates;

associating each digital note with at least one category based on metadata of digital note, wherein the associated category is one of the identified plurality of categories; and arranging the plurality of digital notes into visual clusters by displaying each of the plurality of digital notes on a digital whiteboard at a location based on the at least one category for each digital note, wherein:

multiple instances of a digital note that is associated with multiple categories that are presented on the digital whiteboard are created and visually associated with each of the multiple categories, each of the multiple instances of the digital note having the same metadata based on the properties of the digital note; and in response to re-sorting the digital notes presented on the digital whiteboard, deleting an instance of the multiple instances of the digital note in response to the category that the instance of the digital note is associated with no longer being displayed on the digital whiteboard.

17. The program product of claim 16, wherein the digital whiteboard is a shared digital whiteboard, wherein receiving the plurality of digital notes comprises from a plurality of users, the executable code comprising code to perform:

associating metadata with each digital note, the metadata including an indication of the user creating the note.

18. The program product of claim 16, wherein receiving a plurality of digital notes comprises receiving a handwritten note, wherein the executable code comprises code to perform:

creating a digital version of the handwritten note, wherein creating the digital version comprises converting handwriting in the handwritten note into text;

identifying at least one user-supplied topic from the text, wherein the metadata tag indicates the user-supplied topic; and associating metadata with the digital version of the handwritten note, wherein the metadata indicates one or more of: a time of creation, an author, an ink color, a note color, a geographic location, and a prompt associated with the note.

19. The program product of claim 16, wherein the executable code comprises code to perform:

associating one or more subcategories with each digital note based on the analysis of its content, each subcategory belonging to one of the identified plurality of categories.

20. The program product of claim 16, wherein the executable code comprises code to perform:

receiving a user command specifying the plurality of categories, wherein associating each digital note with at least one category comprises sorting each digital note into one or more of the user-specified plurality of categories based on the metadata.

21. The program product of claim 16, wherein the executable code comprises code to perform:

suggesting one or more categories to a user based on content from the plurality of digital notes;

receiving user selection of at least one suggested category; and identifying the plurality of categories including the at least one user-selected category.

* * * * *